Patented Feb. 28, 1933

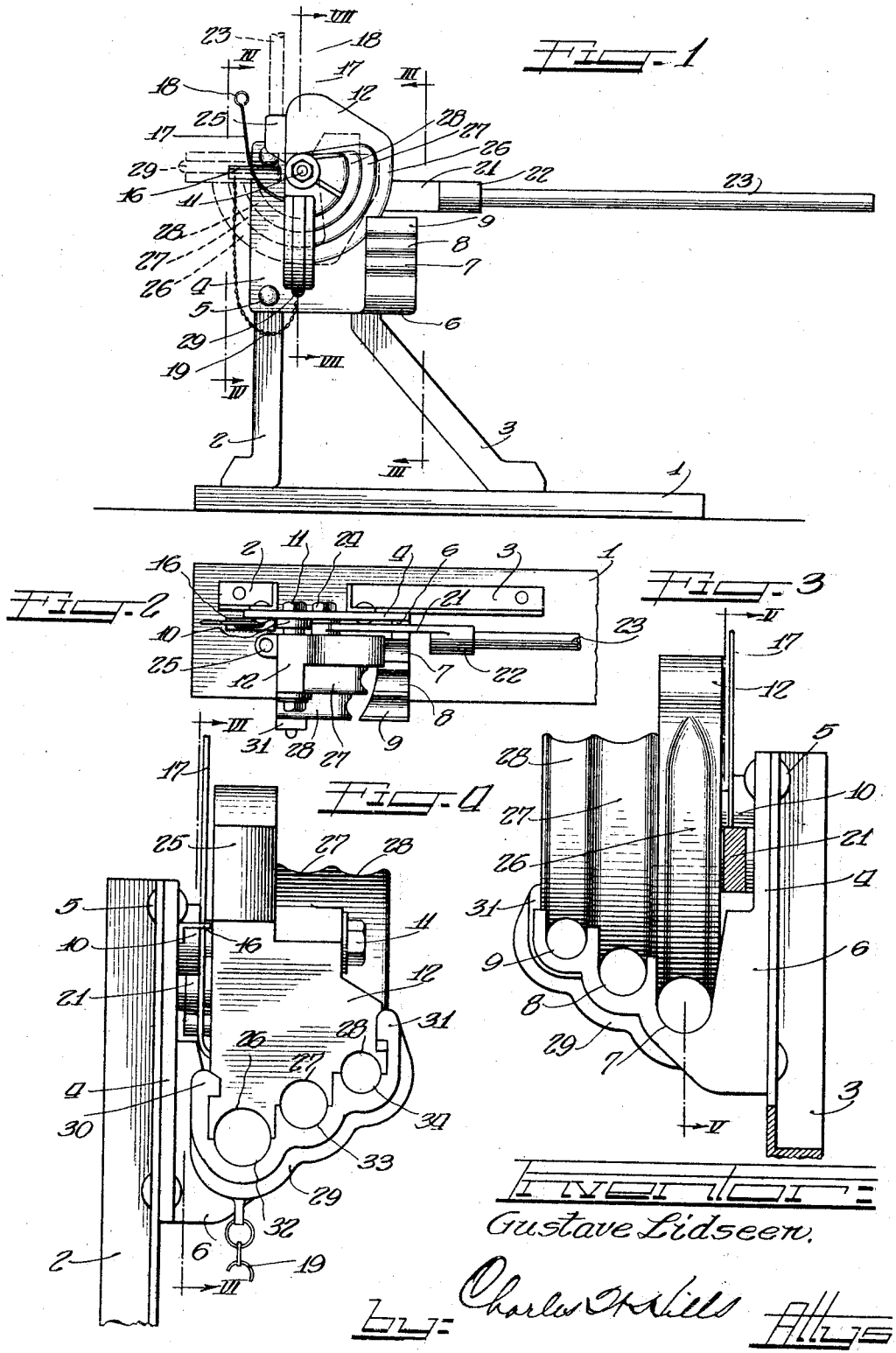

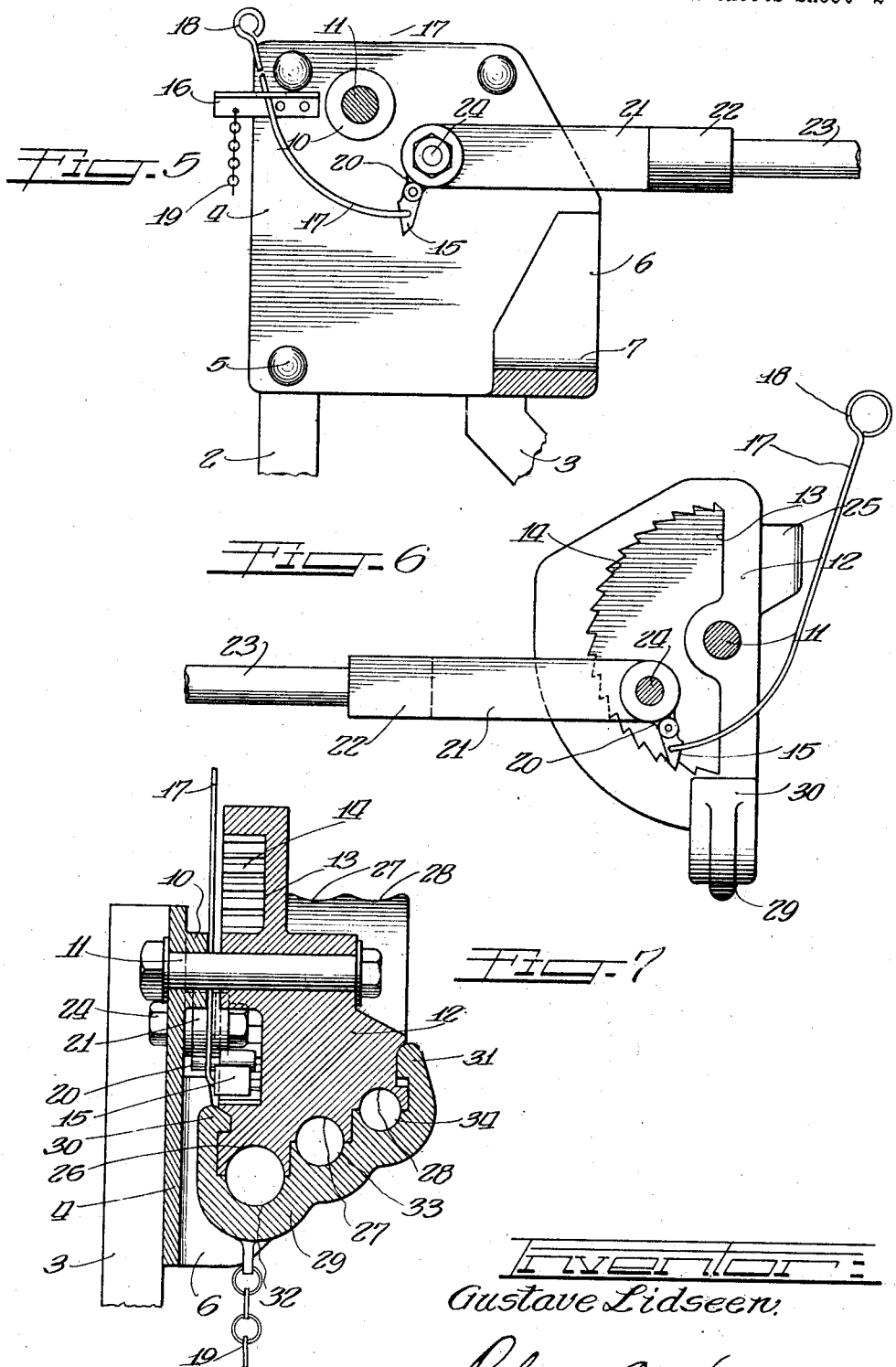

1,899,281

UNITED STATES PATENT OFFICE

GUSTAVE LIDSEEN, OF CHICAGO, ILLINOIS

PIPE BENDING APPARATUS

Application filed April 2, 1931. Serial No. 527,115.

The present invention pertains to an improved form of pipe and tube bending machine of a type constructed to permit the same to be mounted or clamped in position upon a support to provide a stationary type of bending apparatus. The improved device is of simplified construction adapted for bending pipes or tubing of different sizes or diameters either separately or simultaneously by means of a lever operated pawl and ratchet operated multiple type pivoted bending block having a pipe supporting cradle removably engaged thereon.

It is an object of this invention to provide a simplified type of pipe and tube bending apparatus wherein a multiple type pipe bending block or sheave is provided with a removable cradle or pipe supporting hanger constructed to facilitate mounting and removal of pipes or tubes of different sizes.

It is also an object of this invention to provide an improved type of pipe and tube bending apparatus wherein a lever operated multiple type block or sheave is adapted to be operated with respect to a stationary multiple type pipe support to act on one or more pipes or tubes of different sizes to cause bending of the pipes or tubes with the aid of a removable pipe supporting cradle which is adapted to be braced or clamped against removal due to the pressure of the pipes or tubes being exerted against the cradle during a bending operation of the machine.

It is a further object of this invention to provide an improved and simplified type of pipe or tube bending machine including a multiple type rotatable block or sheave adapted to be moved relative to a stationary multiple type of pipe or tube support, said sheave having a multiple type of pipe supporting cradle removably engaged thereon and adapted to be clamped in position by the action of the pipes or tubes being bent.

It is furthermore an object of this invention to provide an improved type of pipe bending apparatus adapted to be conveniently mounted in position on a stationary support and having a multiple type sheave adapted to be operated with respect to a stationary multiple type pipe support by means of a lever operated mechanism provided with a quick release device.

Another object of the invention is to provide an improved and simplified type of pipe bending machine wherein a multiple type of bending block or sheave is adapted to be moved with respect to a stationary pipe support by means of a lever actuated pawl and ratchet mechanism or directly by means of a lever when the pawl mechanism is released.

It is an important object of this invention to provide a simplified form of pipe or tube bending apparatus of the portable type which is so constructed that the same may be readily clamped or secured in position upon a stationary support to permit a multiple type pivoted sheave block carrying a removable pipe supporting cradle to be operated with respect to a multiple type of stationary pipe or tube support to permit pipes or tubes of different sizes to be readily bent.

Other and further important objects of this invention will be apparent from the disclosures in the specification and the accompanying drawings.

The invention (in a preferred form) is illustrated in the drawings and hereinafter more fully described.

On the drawings:

Figure 1 is a side elevation of an improved pipe bending apparatus embodying the principles of this invention, illustrated as mounted on a stationary support and showing the operation of the pipe bending sheave in dotted lines.

Figure 2 is a top plan view of the pipe bending apparatus.

Figure 3 is an enlarged sectional view of the pipe bending apparatus taken on line III—III of Figure 1.

Figure 4 is an enlarged end elevation of the pipe bending apparatus taken on line IV—IV of Figure 1.

Figure 5 is a sectional elevational view taken on line V—V of Figure 3, with parts broken away.

Figure 6 is a vertical sectional view taken on line VI—VI of Figure 4.

Figure 7 is an enlarged vertical detailed section of the pipe bending apparatus taken on line VII—VII of Figure 1, with parts shown in elevation.

As shown on the drawings:

The improved bending apparatus or machine of this invention is of a portable type in that it is constructed to permit the same to be readily moved to allow the same to be removably but rigidly secured to stationary supports. The improved bending apparatus when secured on a stationary support is adapted to be conveniently operated by means of a lever arrangement whereby hollow or passaged articles such as metal pipes or tubing, or solid articles such as rods, bars and the like, of different sizes or diameters may be conveniently and readily bent.

In the present showing of the device, the reference numeral 1 indicates a floor or platform having rigidly secured thereon a supporting frame comprising supporting legs 2 and 3 to which the improved bending apparatus is adapted to be removably secured by any suitable means.

The pipe or tube bending apparatus or machine comprises a body or mounting plate 4 provided with apertures to permit the same to be rigidly secured to the upper ends of the frame legs 2 and 3 by means of rivets 5, bolts or other suitable means. Integrally formed on one of the lower corner sections of the mounting plate 4 is a stationary bracket or arm 6 which projects outwardly and upwardly and is provided with a plurality of pipe or tube receiving sockets, seats or pockets 7, 8, and 9 of different diameters arranged in graduated relation with the largest pocket or seat lowermost and nearest the mounting plate 4 and with the smallest pocket or seat 9 positioned farthest from the mounting plate 4 and at a higher level, as clearly illustrated in Figure 3.

Integrally formed on one side of the mounting plate 4 is a bearing collar or boss 10 in which a stud shaft or bolt 11 is mounted with said bolt projecting through the mounting plate 4 as clearly illustrated in Figure 7. Pivotally mounted on the stud shaft or bolt 11 is a pipe or tube bending block or sheave 12 having an arc-shaped or curved pocket 13 provided in the side thereof adjacent the mounting plate 4. The outer curved edge or margin of the recess or pocket 13 is shaped or cut to provide an arcuate or curved ratchet 14 as clearly illustrated in Figure 6. Coacting with the teeth of the ratchet 14 is a pawl 15. The pawl member 15 has connected thereto one end of a control or release rod 17 the outer end of which is shaped to form a handle 18. The control rod 17 projects upwardly through an opening in a bracket 16 secured to the mounting plate 4. When it is desired to release the pawl 15 the same may be pulled upwardly out of co-acting engagement with the ratchet teeth 14, by means of the release rod 17. The pawl 15 is pivotally supported upon a radial projection or arm 20 which is integrally formed on the pivoted end of a lever base or arm 21 having a socket 22 formed on the outer end thereof in which the inner end of an actuating lever or handle rod 23 is removably engaged. The lever rod 23 is provided for use in connection with the lever arm 21 to increase the leverage to cause operation of the pawl 15 to rotate the bending block or sheave 12. The inner end of the lever arm 21 is pivotally mounted on a stud or bolt 24 which is supported on the mounting plate 4. Integrally formed on one of the edges of the bending block or sheave 12 is an auxiliary socket or pocket 25 for the removable reception of the lever rod 23 when it is desired to rotate the block or sheave 12 direct without employing the pawl and ratchet mechanism when the pawl 15 is released by means of the control rod or handle 17.

The bending block or sheave 12 is provided with a plurality of adjacent positioned pulley segments or bending shoes 26, 27 and 28, the grooves of which are of different diameters and correspond respectively with the diameters of the stationary pipe or tube supporting sockets or seats 7, 8 and 9 respectively.

For the purpose of supporting and holding pipes or tubes or other members to be bent in supported position associated with the bending block or sheave 12, said block or sheave is provided with a removable tube or pipe supporting cradle or retaining bracket 29 provided with hook-shaped arms 30 and 31. Connected to the supporting bracket or cradle 29 is one end of a guard chain 19 the other end of which is secured to the bracket 16. The cradle or supporting bracket 29 is provided with a plurality of pipe or tube receiving pockets or seats 32, 33, and 34 of different diameters corresponding respectively to the diameters of the block or sheave pipe receiving grooves 26, 27, and 28 respectively. The hook members 30 and 31 of the pipe supporting cradle 29 are adapted to be removably engaged in suitable grooves provided in the block or sheave 12 as clearly illustrated in Figure 7 for holding the cradle in position for retaining pipes, tube, or articles to be bent in proper position to be acted upon when the bending block or sheave is operated by means of the lever 23. The improved hanger bracket or cradle 29 is provided with the hook supporting arms to provide an arrangement whereby the pipes or articles to be bent may be readily engaged between the bending block or sheave and the cradle 29. After a bending operation of the pipes or tubes, the cradle 29 may be readily removed from the block or sheave to permit the bent pipes or tubes to be removed from the machine.

The improved bending apparatus or machine is constructed to permit pipes, tubes, rods or bars of different diameters or sizes to be conveniently bent in the machine. The stationary bracket 6 forming a part of the mounting plate of the machine is provided with a plurality of sockets or seats of different diameters or sizes to correspond with the different sockets or seats provided in the rotatable bending block or sheave. A pipe or tube to be bent is first placed in the desired pocket or seat afforded in the stationary pipe or tube supporting bracket 6 after which the cradle 29 is engaged beneath the pipe or tube and the hook members 30 and 31 of the cradle are then slidably engaged in the grooves of the bending block or sheave 12 to hold the pipe or tube in a selected opening of the bending block or sheave. With a pipe or tube mounted in position in the bending apparatus or machine the lever 23 is operated by swinging the same upwardly a selected distance thereby permitting the spring controlled pawl 15 to slidably track over the teeth of the ratchet 14 until the pawl reaches a selected tooth. The lever 23 is then forced downwardly thereby causing the bending block or sheave 12 to be slightly rotated about its supporting shaft or bolt 11 causing the portion of the pipe engaged between the block and the cradle 29 to tightly press or force the cradle 29 outwardly to rigidly hold the same clamped with respect to the bending block or sheave 12. With the slight rotation of the bending block or sheave, the pipe or tube is thus bent around the respective bending groove. Repeated operation of the lever and the pawl and ratchet mechanism causes the bending block or sheave to be gradually moved from the full line position of Figure 1 into the dotted line position thereby causing the pipe or tube to be gradually and smoothly bent. After a bending operation, as described, the cradle 29 is slidably removed from the bending block or sheave 12 thereby permitting the bent tube or pipe to be conveniently and readily removed from the bending apparatus or machine. In case the pipe or tube to be bent is of light weight and is adapted to be easily bent, the lever 23 is removed from the socket 22 and is engaged in the socket 25. The pawl 15 is now released from engagement with the ratchet 14 by pulling upwardly on the control rod or handle 17—18. With the pawl 15 released, the bending block or sheave 12 is adapted to be operated by the lever 23 now seated in the socket 25 to cause the bending block or sheave 12 to be rotated about its pivotal support thereby causing the tube or pipe engaged in the machine to be readily bent an amount depending upon the rotation of the block or sheave with respect to the stationary pipe or tube supporting bracket 6.

Attention is called to the fact that the improved bending apparatus or machine being provided with different sized pipe receiving openings in the bending block or sheave and with different sized pipe receiving sockets or seats in the stationary supporting bracket 6 permits pipes, tubes, bars or rods of different sizes or diameters to be conveniently bent in the machine. It will also be understood that, if desired, a plurality of pipes of different sizes may be simultaneously bent in the machine by engaging the pipes or tubes in the respective receiving openings and sockets provided.

It will, of course, be understood that various details of construction may be varied through a wide range without departing from the principles of this invention, and it is, therefore, not the purpose to limit the patent granted hereon otherwise than is necessitated by the scope of the appended claims.

I claim as my invention:

1. An article bending machine comprising a mounting plate, a pipe supporting arm secured thereon and having a plurality of pipe receiving sockets of different sizes formed therein, a sheave block rotatably supported on said mounting plate and having a plurality of pipe receiving grooves of different sizes formed therein, a pipe supporting cradle removably engaged on said sheave block and having a plurality of pipe receiving sockets of different sizes therein, and means for rotating said sheave block to bend an article engaged in the machine.

2. A pipe bending machine comprising a support, a mounting plate secured thereto, a pipe supporting bracket on said mounting plate, a sheave block rotatably supported on said mounting plate, a pipe supporting member removably engaged on said sheave block for holding a pipe associated with said sheave block, a ratchet mechanism formed in said sheave block, a lever device, and a pawl carried by said lever device and coacting with said ratchet mechanism for causing rotation of the sheave block.

3. A pipe bending machine comprising a support, a mounting plate secured thereto, a pipe supporting bracket formed on said mounting plate and having a plurality of pipe receiving sockets of different sizes formed therein, a sheave block rotatably supported on said mounting plate and having a plurality of pipe grooves of different sizes formed therein, a cradle member removably engaged on said sheave block and having a plurality of pipe receiving sockets of different sizes formed therein opposite the correspondingly sized grooves formed in the block, a ratchet formed in the sheave block, a pawl coacting with said ratchet, and a lever mechanism for operating said pawl to cause rotation of the sheave block with respect to the pipe supporting bracket to cause bending of a pipe engaged in the machine.

4. A pipe bending machine comprising a mounting plate, a pipe supporting bracket secured thereon and having a plurality of pipe receiving sockets of different sizes formed therein, a sheave block rotatably supported on said mounting plate and having a plurality of adjacently positioned pipe receiving grooves of different sizes formed therein, a pipe receiving cradle member removably engaged on said sheave block and having a plurality of pipe supporting sockets formed therein of different sizes, a ratchet formed in said sheave block, an operating lever pivotally supported on said mounting plate, a pawl pivotally supported on said operating lever in coacting relation with said ratchet, and a release mechanism connected with said pawl for moving the same out of engagement with said ratchet.

5. A pipe bending machine comprising a mounting plate, a pipe supporting bracket thereon, a sheave block pivotally supported on said mounting plate and having a plurality of adjacently positioned pipe receiving grooves formed therein, a pipe supporting cradle having a plurality of pipe supporting recesses formed therein, members formed on said cradle for removably engaging the sheave block for holding the pipe supporting cradle in position, and a lever mechanism for rotating the sheave block together with the cradle member with respect to the pipe supporting stationary bracket to bend the pipe engaged in the sheave groove.

6. A pipe bending machine comprising a stationary pipe support, a sheave block pivotally mounted on said support and formed with a plurality of pipe bending sheave segments for receiving and bending pipes of different sizes, a pipe retaining cradle member removably engaged on the sheave block, an internal ratchet segment formed in said sheave block, a lever pivotally supported on said support, a pawl pivotally supported on the inner end of said lever in coacting engagement with said internal ratchet and segment, a lever receiving socket formed on said sheave block, a release means connected with said pawl for moving the same out of engagement with the internal ratchet segment to permit the sheave block to be rotated to produce a bending operation, and a lever member removably engaged in the socket for actuating the sheave block when the pawl is released.

7. A pipe bending machine comprising a pipe supporting bracket, a sheave block pivotally mounted thereon and having a plurality of grooved sheave segments of different sizes integrally formed thereon adjacent one another, a pipe supporting cradle member removably engaged on said sheave block, a ratchet segment formed in said sheave block, an arm pivotally supported on said supporting bracket, a lever removably engaged in said arm, a projection on the pivoted end of said arm, a pawl pivotally mounted on said projection in coacting engagement with the ratchet segment, and a release mechanism for releasing the pawl and moving the same out of coacting engagement with the ratchet segment.

8. A pipe bending machine comprising a pipe supporting stationary member, a pipe bending member movably mounted thereon, and comprising a grooved sheave block having a plurality of sheave segments of different sizes integrally formed thereon, a cradle member having a plurality of pipe receiving sockets of different sizes formed therein, supporting members integrally formed on said cradle and slidably engaged in the grooves of said sheave block, and means for moving the sheave block with respect to the stationary support to bend pipes around the sheave segments.

9. A pipe bending machine comprising a stationary support, a sheave block rotatably mounted thereon, a pipe retaining member removably engaged on said sheave block, said sheave block having a recess formed therein, ratchet teeth formed in said recess, an arm pivotally mounted on said stationary support, a lever removably engaged in said arm, and a pawl pivotally mounted on said arm in coacting engagement with said ratchet teeth.

In testimony whereof I have hereunto subscribed my name at Chicago, Cook County, Illinois.

GUSTAVE LIDSEEN.